July 24, 1934.  B. W. SPITLER  1,967,977
PUNCTURE REPAIR DEVICE
Filed Oct. 26, 1933
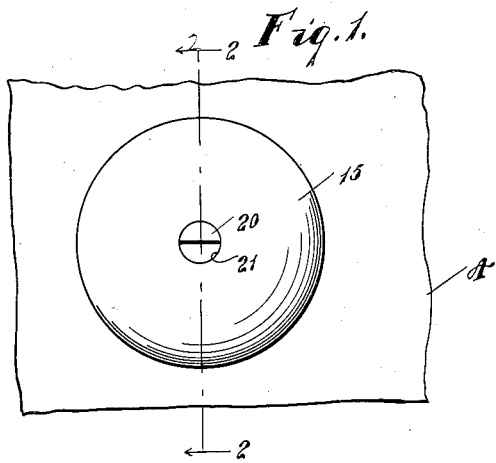
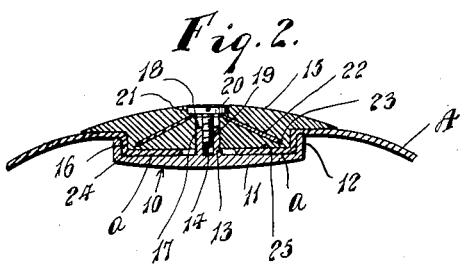
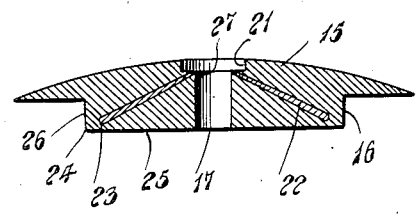
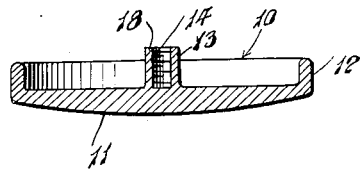
Inventor
B. W. Spitler.

Patented July 24, 1934

1,967,977

UNITED STATES PATENT OFFICE 1,967,977

PUNCTURE REPAIR DEVICE

Bernard W. Spitler, Cambridge, Mass.

Application October 26, 1933, Serial No. 695,342

3 Claims. (Cl. 152—26)

The invention relates to devices for making a mechanical repair to inner tubes of pneumatic tires, and has for its principal object the provision of an improved construction of puncture plug of the type shown in my Patent No. 1,139,140, dated May 11, 1915.

In puncture plugs of the type referred to, it has been found that these plugs having mating clamping members of metal were undesirable in use because the mating member on the outer side of the inner tube chafes the inner lining of the tire shoe, thus weakening the shoe at that point and making it liable to blow out.

By experimentation I have found that by constructing the outer member of the plug of rubber or other yielding material the chafing of the lining of the shoe is avoided.

Because of the yielding nature of the outer member of the plug it was found that the material of the inner tube that was clamped between the two members would not in all instances be securely held against the escape of air, and in some instances the material would be pulled from clamping engagement between the plug members and presented a problem to be solved.

The solution of this problem is one of the objects of my invention, and consists in the provision of a reinforcing member for the yielding member of the plug that is engaged by the screw holding the two members together, and is so constructed as to expand the portion of the member within the other member of the plug to clamp the material of the tire securely, and prevent leakage and removal of the material of the tire from between the plug members.

The invention will be described in detail hereinafter and will be found illustrated in the accompanying drawing, in which Figure 1 is a plan view of my improved puncture plug shown applied to a fragment of an inner tube, Figure 2 is a sectional view on a plane indicated by the line 2—2 of Figure 1, Figure 3 is a transverse sectional view of the male member of the plug, and Figure 4 is a similar view of the female member.

In the drawing similar reference characters are used to designate corresponding parts in all of the views.

The improved puncture plug, as shown in the drawing, consists of a female member 10, comprising a circular base member 11 having a circumferential flange 12 at substantially right angles to the inner surface of the base member 11, and an integral projection 13 that is interiorly threaded as shown at 14.

The mating member of the plug designated 15 is made of rubber or other suitable yielding material, and having a central projecting portion 16 that fits within the recess formed by the flange 12 and is slightly less in diameter than the inner wall of the flange so as to engage the material of inner tube A and folded within the member 10 as shown at $a$. The member 15 is provided with an opening 17 to receive the interiorly threaded projection 13, the thickness of the member 15 being greater than the length of the projection 13 as best shown in Figure 2 so that the upper edge 18 of such projection is remote from the upper surface of the member 15, for the purpose to be hereinafter stated. The two members 10 and 15 are secured in clamping position as shown in Figure 2 by means of a screw 19 having a head 20 that is countersunk in the recess 21 in said member 15 below the outer surface of the member 15, so that the only portion of said member 15 that engages the inner lining of the tire shoe is the yielding material of the member 15 to obviate abrasion of the lining as heretofore referred to.

The material of the member 15 is preferably rubber, and ordinarily presents a non-friction surface to the rubber of the inner tube and between said member and the member 10, but to more securely clamp the material of the tube between said members to prevent possibility of the material slipping out between the members, I provide a hollow conical reinforcement member 22 of resilient material such for instance as steel, said reinforcement member having its outer edge 23 presented toward the angle 24 between the inner face 25 of the reduced portion 16 and the side wall 26 of said reduced portion, while the smaller portion of the conical member 22 is provided with an opening 27, and the edge of said opening is at the inner face of the countersink 21 and engageable by the head 20 of the screw 19, so that when the screw is turned in the projection 13 the conical reinforcement 22 reinforces the reduced portion 16 to securely hold the material of the inner tube clamped between the members 10 and 15, this action being assisted by the resilient material of the member 22. Having the length of the projection 13 less than the thickness of the member 15 as hereinbefore referred to, so that the upper edge 18 of the projection 13 is normally spaced from the head 20 of the screw, permits the clamping movement of the reinforcing member 22 as hereinbefore stated.

What is claimed is:—

1. A puncture repair device, comprising a recessed member of rigid material having a threaded projection, a mating member of yielding material engaging in the recessed member and having an opening receiving said projection, a threaded member engaging said threaded projection to secure the members in assembled relation, and a conical shaped resilient member embedded in the material of the mating member and engageable by the threaded member to expand the yielding material into the recessed member.

2. A puncture repair device, comprising a circular member having a peripheral flange extending at an angle thereto, a central projection on said member having interior screw-threads, a second member of less diameter than said flange to engage material around a puncture and fold it against the circular member and the flange, said second member being of yielding material and having an opening receiving said projection, a headed screw securing the first and second members together, and means contained in said second member and engaged by the screw head to expand its edge against the angle between the circular member and the flange.

3. A puncture repair device for inner tubes, comprising a recessed member or rigid material for application to the interior of an inner tube, an integral hollow projection in said member and interiorly threaded, a mating member for the outer side of said tube of yielding material, said mating member coacting with the recessed member to clamp the material of the inner tube within said recessed member, and having an opening receiving said projection, a screw engaging the interior threads and having a head engaging the mating member and a conical shape resilient member contained in said mating member and engaged by the screw head to expand the mating member into engagement with the inner tube.

BERNARD W. SPITLER.